Patented Oct. 15, 1929

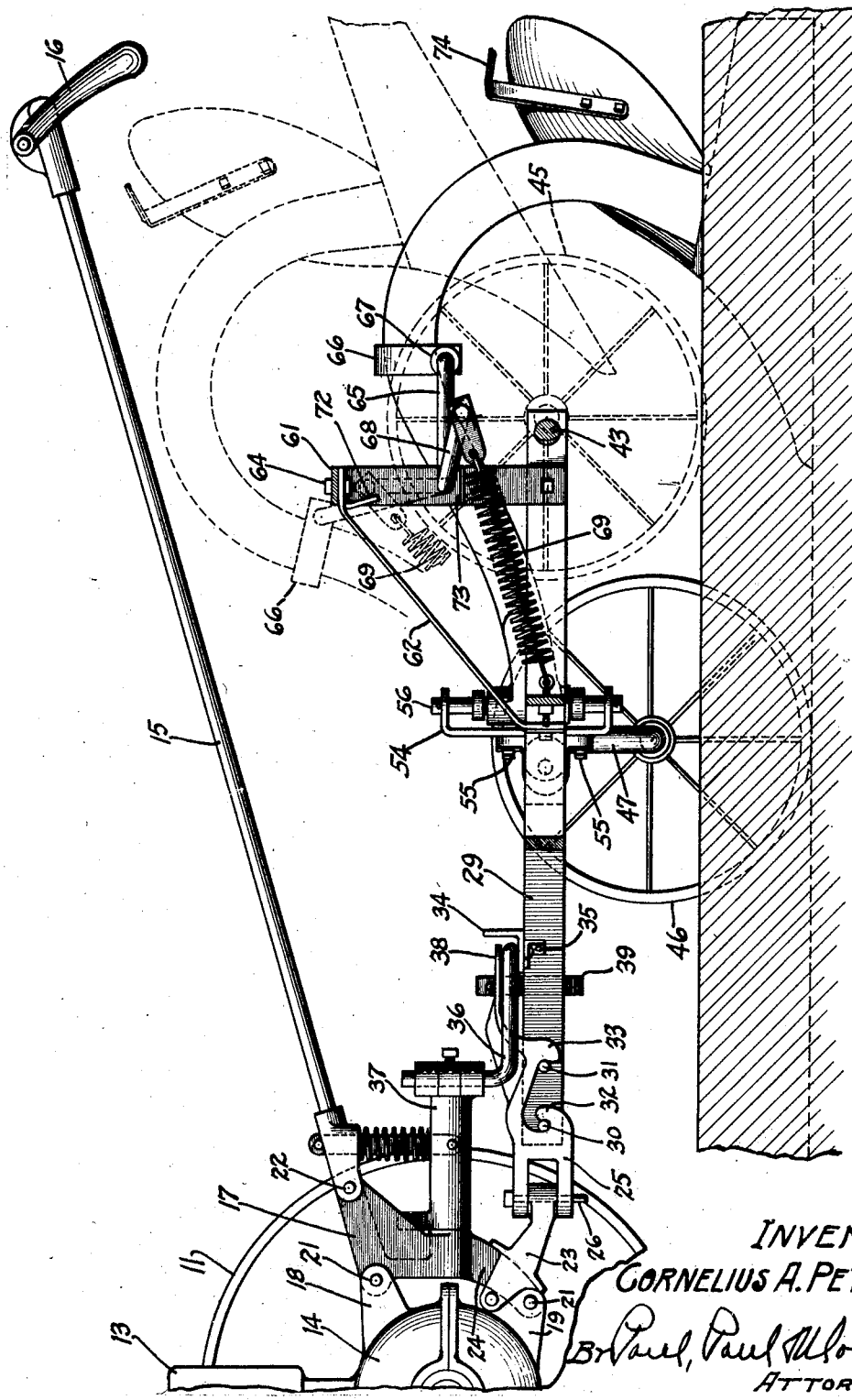

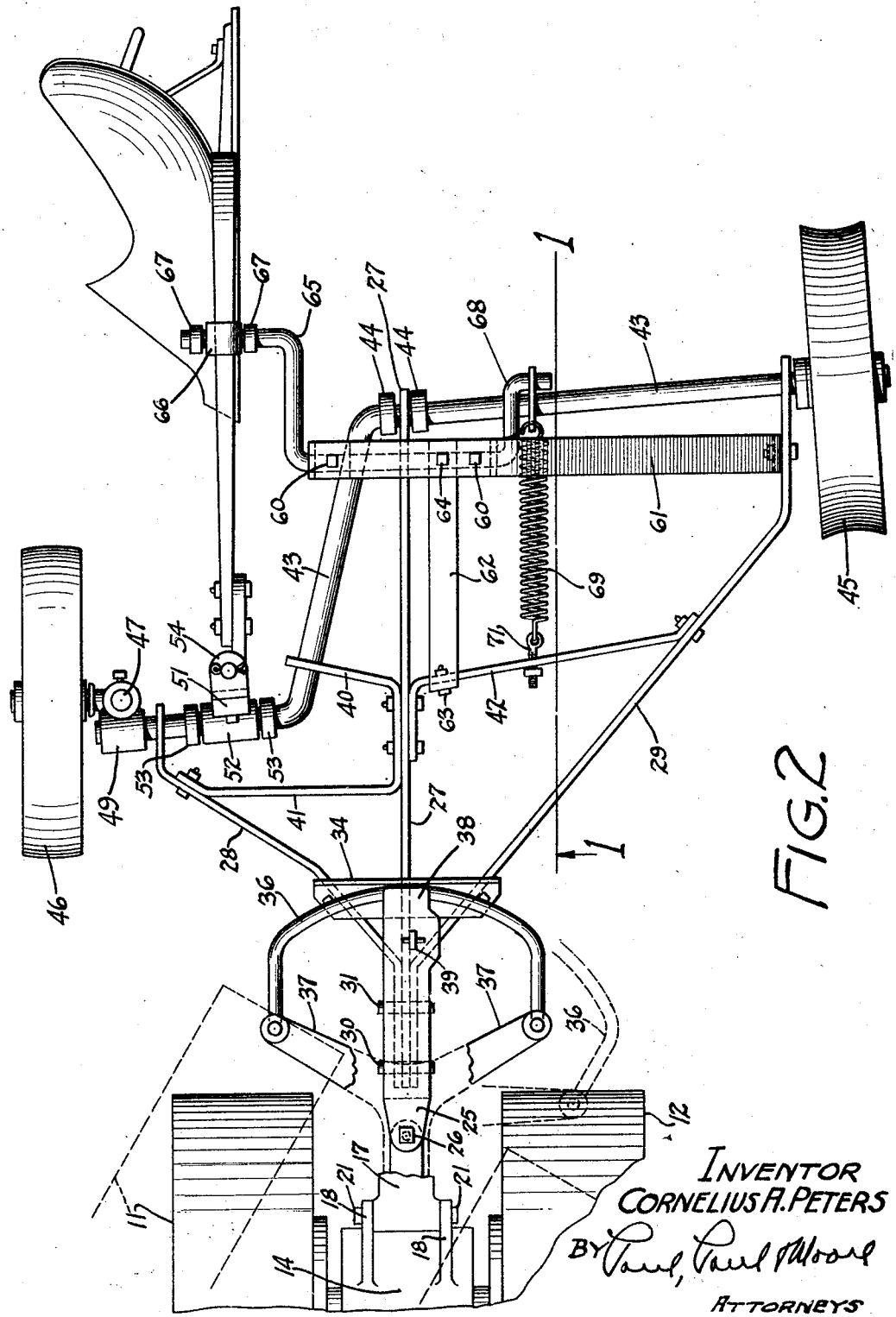

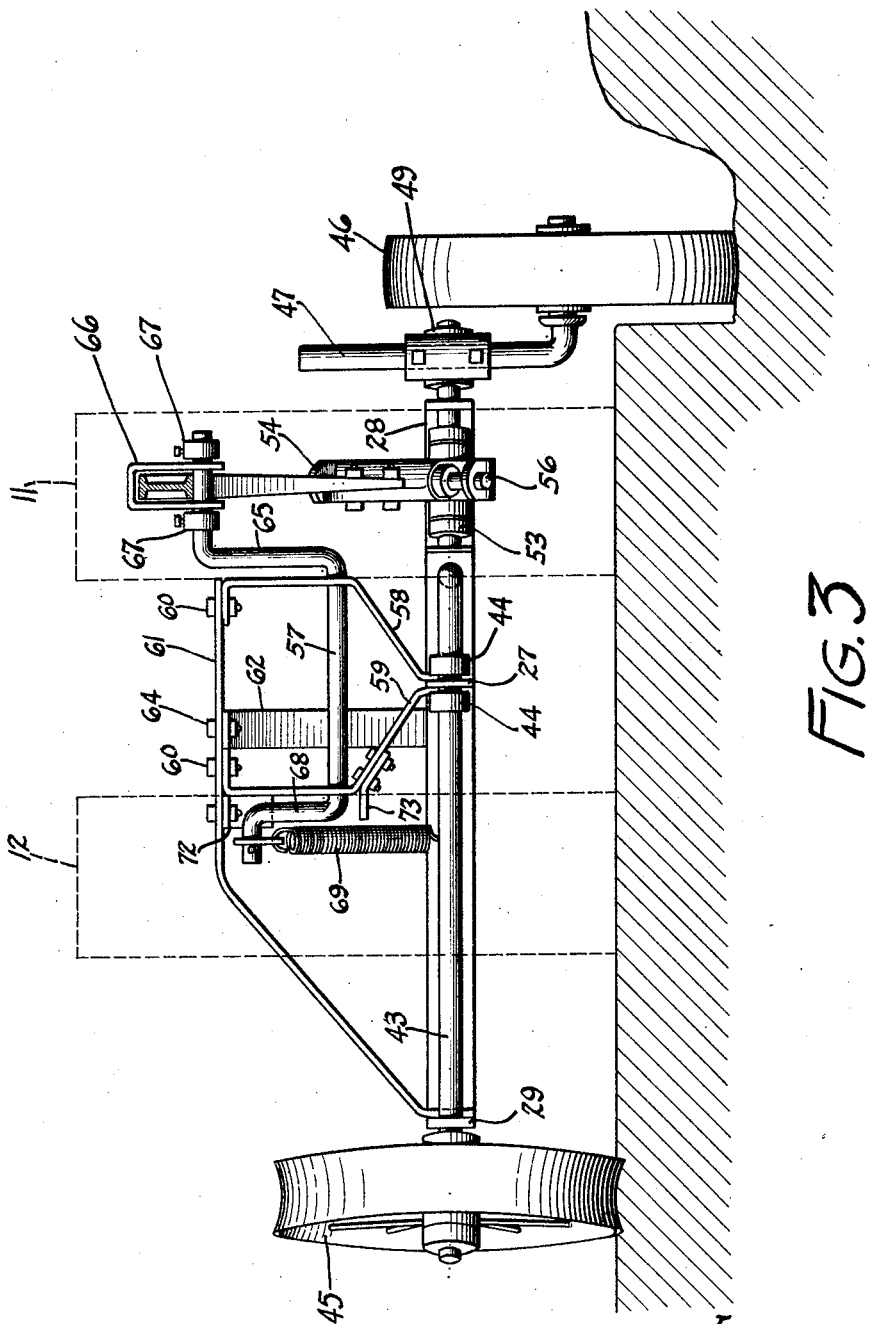

1,732,108

UNITED STATES PATENT OFFICE

CORNELIUS A. PETERS, OF MINNEAPOLIS, MINNESOTA, ASSIGNOR TO THE NEW BEEMAN TRACTOR COMPANY, OF MINNEAPOLIS, MINNESOTA, A CORPORATION OF MINNESOTA

DRAWBAR FRAME

Original application filed January 18, 1923, Serial No. 613,423. Divided and this application filed August 14, 1926. Serial No. 129,208.

This invention relates to drawbar frames such as are commonly used in connection with tractors generally, and particularly relates to drawbar frames to which plows or other ground-working implements may be attached for the purpose of tilling and working the soil.

This application is divisional of my application for drawbar frames filed January 18, 1923, Serial No. 613,423.

Tractors of the two-wheeled type are usually provided with rearwardly extending handle bars by which the operator may steer and guide it when moving along the road or in the field. By means of the handle bars, the operator may also balance the tractor when disconnected from the drawbar frame or load. However, when the tractor is connected to, and hauling a load, means must be provided to positively prevent the tractor from tilting or buckling at the point where it is connected to the drawbar frame.

In the drawbar frame featured in this invention, means are provided whereby the tractor will be positively prevented from tilting or jackknifing when connected to the drawbar frame without the use of any loose bolts or pins. This frame is also mounted on a pair of suitable carrying wheels, thus providing substantially a four-wheeled tractor when coupled to the tractor proper. The pivot or kingbolt connecting the tractor to the drawbar frame is also located at a point where it will practically eliminate all side thrust on the handle bars, usually prevalent in machines of this type.

Features of the invention include the manner of connecting a two-wheeled implement carrying frame having furrow and land wheels, as well as to the particular manner of connecting the frame to the tractor and of the positional connection of the implement, as a plow, at a point laterally of the line of draft of the tractor.

Other features of the invention include the mechanism for raising, lowering and holding the implement in and above the ground and to the parallel relation of the wheel carrying shafts of the machine, respectively carrying the furrow and land wheels, the land wheels being disposed at an acute angle to the line of draft, to offset and compensate for the pull to the furrow side, caused by the offset pivotal relation of the implement to the king bolt connection of the frame with the tractor.

Means are also provided whereby the plow or other ground-working implements may be raised or elevated from the ground and retained in an inoperative position without the use of the ordinary hand lever and quadrant.

An object of this invention, therefore, is to provide an improved drawbar frame.

Other objects of the invention will more fully appear from the following detailed description and the accompanying drawings and will be pointed out in the annexed claims.

In the drawings, there has been disclosed a structure designed to carry out the objects of the invention, but it is to be understood that the invention is not confined to the exact features shown, as various changes may be made within the scope of the claims which follow.

In the drawings:

Figure 1 is a vertical sectional view on the line 1—1 of Figure 2, showing the means provided for connecting the drawbar frame to the tractor and also indicating in full and dotted lines, the two positions of the plow;

Figure 2 is a plan view of Figure 1;

Figure 3 is a view in rear elevation showing the manner of supporting the plow upon the drawbar frame.

In the selected embodiment of the invention here shown, there is illustrated a two-wheeled tractor of ordinary construction comprising the usual traction wheels 11 and 12, engine 13, crank case 14, and handle bars 15 provided with the usual hand-grips 16.

A bracket 17 is mounted upon the crank case 14 of the engine in any suitable manner, preferably by means of the rearwardly extending lugs 18 and 19 and the pins 21. The handle bars are pivotally mounted upon this bracket by means of the pins 22. A draw lug 23 is secured to the depending arm 24, of the bracket 17, and extends rearwardly to receive the forked end of a coupling bracket 25, pivoted thereto by a suitable kingbolt 26. This bracket is adapted to receive the forwardly extending terminal end of the drawbar frame, as indicated in Figures 1 and 2.

Referring to Figure 2, it will be noted that the main part of this frame consists of three metallic bars so interbraced with each other as to form a very substantial and rigid frame construction. The center bar 27 is preferably straight, while the two side bars 28 and 29 converge toward the forward end of the frame where their terminal ends are preferably arranged in parallel relation to the center bar 27. The two ends of the bars 28 and 29, and the end of the bar 27, are secured together by any suitable means such as by the bolts or pins 30 and 31. The ends of these pins preferably project beyond the outside face of the side bars 28 and 29 for the purpose of engaging the hooks 32 and 33 provided in the coupling bracket 25.

Means are also provided for positively preventing the tractor and drawbar frame from buckling at the point of hitch when hauling a load. A suitable angle bar 34 is provided at the forward end of the frame and has its ends secured to the side bars 28 and 29, preferably by means of the angle clips 35, riveted thereto. An arcuately formed supporting member 36 is adjustably mounted in the rear end of a Y-shaped bracket 37 which is borne by the bracket 17. This supporting member is adapted to rest upon the upper face of the horizontal flange of the angle bar 34. A rearwardly extending end portion 38 is provided upon the bracket 25 and is adapted to overhang the supporting member 36, and has mounted therein a suitable latch 39 adapted to engage the lower edge of the center bar 27 when the tractor and drawbar frame are coupled together.

Thus, when the tractor and frame are coupled together, as shown in Figure 1, it will be impossible for the coupling to buckle, as the supporting member 36 will be prevented from downward movement by the angle bar 34 and in like manner prevented from upward movement by the end portion 38 and latch 39 engaging the bottom of the bar 27. The supporting member 36, however, will be free for lateral movement, as indicated in Figure 2, when turning corners.

When it is desired to disconnect the tractor from the drawbar frame, it is only necessary to release the latch 39 from the bar 27 and tilt the tractor forwardly by means of the handle bars 15. When this is done, the supporting member 36 will be disengaged from the angle bar 34 and also the hooks 33 will be released from the pins 31. The operator will then impart a slight upward lift to the forward end of the frame, thereby disengaging the pins 30 from the hooks 32 and thus completely releasing the tractor from the drawbar frame.

The above described mechanism substantially forms the subject matter of the application above referred to and is given here only for the sake of completeness.

As is shown in Figure 2, the side bars 28 and 29, and the center bar 27 are securely braced together by means of the braces 41 and 42. The rear terminal ends of the two side bars and the center bar, and also the end 40 of the brace bar 41, are preferably apertured to receive the irregularly shaped shaft 43, mounted therein. This shaft is restricted against lateral movement by means of the two collars 44, secured to the shaft.

A land wheel 45 having a concave face or rim is loosely mounted on one end of the shaft 43, which shaft is angularly related, as shown with the line of draft, the angle being slight. The portions 43 of the shaft are parallel and are so made for convenience in manufacture. The object of providing the offset relation between the wheel carrying shaft of the center line of draft, is to skew the land wheel at the angle shown, so that the drag will be toward the land side to offset the opposite tendency of the implement. Upon the opposite end of the shaft a furrow wheel is provided, designated 46, which has a convex face, said wheel being mounted for adjustment upon a vertical shaft 47. This bearing is provided with an integral hub 49, which is secured to the end of the shaft 43.

It will be noted that the positive pivot for the frame, that is the kingbolt 26, is centrally located in the tractor. The implement is pivoted for vertical movement at a point laterally of the line of draft and rearwardly of the kingbolt connection. Thus a two-wheeled frame, with an offset plow, and with the frame having a positive point of draft, is provided. This is a novel feature of the present device.

Means are also provided for adjustably connecting the plow or ground-working implement to the drawbar frame. A bracket 51 having a horizontal hub 52, loosely mounted upon the shaft 43, is provided between a pair of suitable collars 53 adjustably mounted upon the shaft. A forked draft bar 54 is secured to the bracket 51 by suitable bolts 55, and is apertured to receive a draft pin 56 to which the plow beam is connected, the forward end of the plow beam being capable of up and down adjustment upon this pin.

Means are also provided for retaining the plow in an inoperative position, as indicated by dotted lines in Figure 1, when it is desired to move the apparatus from one place to another.

A suitable crank rod or shaft 57 is preferably mounted in a pair of upright bars 58 and 59 having their lower ends secured to the center bar 27. A brace bar 61 is preferably secured to the upper ends of the upright bars 58 and 59 by bolts 60, and extends outwardly therefrom and has one end secured to the side bar 29. A similar brace bar 62 is interposed between the horizontal portion of the brace bar 61 and the cross bar 42, being secured thereto by suitable bolts 63 and 64. The crank rod 57 is provided at one end with a crank arm 65. The horizontal portion of this crank arm extends beneath the plow beam, as indicated in Figure 3, and has adjustably mounted thereon a U-shaped member or clevis 66 by means of the collars 67. The opposite end of the crank rod 57 is provided with a similar crank arm 68 adapted to support one end of a helical compensating spring 69. The other end of this spring is adjustably connected to the cross brace 42 by means of an eyebolt 71. Suitable stops 72 and 73 are also provided to limit the movement of the crank arms 65 and 68. It is also preferable to provide a hand-grip 74 upon the mould board of the plow by means of which the operator may raise and lower the plow.

When the plow is in its operative or working position, shown in full lines in Figure 1, the horizontal end portion of the crank arm 68 will be slightly below a horizontal centerline drawn longitudinally of the frame. When in the above position, the spring 69 will be under tension, thereby imparting a slight downward pressure upon the plow beam by means of the crank arm 65 and clevis 66.

When it is desired to raise or elevate the plow from the full to the dotted line position, shown in Figure 1, the operator will grasp the hand-grip 74 and raise the plow. As soon as the crank arm 68 gets to a point above its horizontal centerline, the compensating spring 69 will begin to contract, thereby counteracting the weight of the plow. The arm 68 will then engage the stop lug 72 and will be firmly held thereagainst by the spring, in which position the plow will be positively held in its inoperative or raised position. To lower the plow it is only necessary to grasp the hand-grip 74 and impart a downward pressure thereupon, or strike it with the foot. Thus, by the use of the above described mechanism, the usual hand lever and quadrant may be entirely dispensed with, thereby considerably simplifying the construction and reducing the cost of manufacture.

An important feature of the invention resides in the relative location of the pivotal point 52 of the implement with the frame. Referring to Figure 2, it will be noted that the kingbolt 26 is located midway between the two traction wheels 11 and 12, rearwardly of the axle of the tractor. It will also be noted that the connection 52 is arranged laterally of the draft line and in this instance, what may be termed a considerable distance rearwardly of the kingbolt 26. The lateral and rearward location of this connection may be changed slightly to meet varying conditions.

The object of the above arrangement is to reduce to a minimum any side strain which may be transmitted to the handle bars due to the center of draft in the drawbar frame being offset from the centerline of the tractor, and also any strains which may be caused by turning corners, etc. Also by mounting the kingbolt as above described, the tractor will be much easier to guide and steer, and also the draft will be equally divided between the two traction wheels.

I claim as my invention:

1. In combination with a traction machine having a steering device and a draft frame and carrying wheels therefor, a ground-working implement connected with said draft frame, a crank rod mounted in said draft frame and having a rocking movement therein, said rod having means for connection with said ground-working implement to raise it when said rod is rocked in one direction, a spring connected with said rod to be put under tension by the rocking thereof, to hold said rod in its raised or lowered position, and a suitable lifting device connected with said implement for raising and lowering it and operating said rod.

2. In combination with a traction machine, a draft frame having carrying wheels connected therewith, a steering device for said traction machine overhanging said draft frame, a plow having a beam connected with said draft frame, a rod mounted transversely in said draft frame and having crank arms thereon, one of said crank arms having means for connection with said beam, a spring connected with the other crank arm and put under tension by the rocking of said rod, and operating to hold said rod and its crank arms in a lowered or raised position, and a lifting device within convenient reach of the operator for raising and lowering said beam and plow against the tension of said spring.

3. A tractor, a draft frame having a kingbolt connection therewith centrally, said frame having land and furrow wheels, and a ground working implement pivoted to said frame for vertical movement, laterally of the line of draft, the land wheel making an acute angle with the line of draft.

4. A tractor, a two-wheeled draft frame having a kingbolt connection therewith, and a ground working implement pivoted to said frame for vertical movement, laterally of the line of draft, one of the wheels making an acute angle with the line of draft in a forwardly divergent direction.

5. In combination, a tractor, a wheel frame pivoted to the tractor substantially on the line of draft and having furrow and land wheels rearwardly of the tractor, and respectively laterally at opposite sides of the draft line, and a tool pivoted to the frame adjacent said furrow wheel, the axis of the land wheel on its forward side forming an obtuse angle with the line of draft.

6. In combination, a tractor, a wheel frame pivoted to the tractor substantially on the line of draft and having furrow and land wheels rearwardly of the tractor, and respectively laterally at opposite sides of the draft line, and a tool pivoted to the frame adjacent said furrow wheel and extending rearwardly, the axis of the land wheel on its forward side forming an obtuse angle with the line of draft, said land wheel being arranged rearwardly of said furrow wheel and being a greater distance laterally of the draft line.

7. In combination, a tractor, a wheel frame pivoted to the tractor substantially on the line of draft and having furrow and land wheels rearwardly of the tractor, and respectively laterally at opposite sides of the draft line, and a tool pivoted to the frame adjacent said furrow wheel and extending rearwardly, the axis of the land wheel on its forward side forming an obtuse angle with the line of draft, said land wheel being arranged rearwardly of said furrow wheel and being a greater distance laterally of the draft line, the tool being pivoted to permit of a vertical motion only.

8. In combination, a tractor, a wheel frame pivoted to the tractor substantially on the line of draft and having furrow and land wheels rearwardly of the tractor, and respectively laterally at opposite sides of the draft line, and a tool pivoted to the frame adjacent said furrow wheel and extending rearwardly, the axis of the land wheel on its forward side forming an obtuse angle with the line of draft, said land wheel being arranged rearwardly of said furrow wheel and being a greater distance laterally of the draft line and means connecting the frame with the tool to substantially prevent lateral motion thereof and the tool being pivoted to permit of a vertical motion.

9. A tractor, a frame pivoted substantially centrally of the tractor in direction of line of draft and having oppositely laterally arranged furrow and land wheels, and a tool having a pivotal connection with the frame adjacent said furrow wheel and intermediate said wheel and the center line of draft and rearwardly of a line drawn through the hubs of the wheels, said land wheel being arranged rearwardly of the furrow wheel in a transverse direction, and being a greater distance laterally of the draft line than the furrow wheel and having its axis arranged to cause the wheel to prevent the tractor from creeping toward the furrow side.

In witness whereof, I have hereunto set my hand this 11th day of August, 1926.

CORNELIUS A. PETERS.